AUTOMATIC GAIN CONTROL

Filed Oct. 21, 1966

Inventors
Joseph Markin
Alan Sobel
By John J. Pederson
Attorney

United States Patent Office 3,497,622

Patented Feb. 24, 1970

3,497,622

AUTOMATIC GAIN CONTROL

Joseph Markin and Alan Sobel, Evanston, Ill., assignors to Zenith Radio Corporation, Chicago, Ill., a corporation of Delaware Filed Oct. 21, 1966, Ser. No. 588,582
Int. Cl. H04n 5/52
U.S. Cl. 179—1 2 Claims

ABSTRACT OF THE DISCLOSURE

An audio gain control system for automatically adjusting the program output level of a loudspeaker system to compensate for noise level changes within the listening area served by the system. A first sensing channel, including a microphone within the listening area, develops a first control signal dependent on the combined program and noise level within the listening area. A second sensing channel develops a second control signal dependent only on the program output level of the loudspeaker system. In order that the two channels have nearly identical bandpass characteristics, a single bandpass filter is alternately switched between the two sensing channels. A third control signal dependent on the difference between the first two control signals varies the speaker output level to maintain a constant program-to-noise ratio within the listening area.

This invention is directed to a new and improved audio control system for maintaining the volume level of a desired program signal within a given listening area at a substantially constant ratio to a fluctuating noise level in that area.

It is often desirable that the volume level of a program being reproduced by a loudspeaker or similar sound reproducing device within a given listening area be varied in accordance with variations in the ambient noise level in that area. For instance, in factories, operating machinery may suddenly produce a high noise level which, if not compensated for, would render the normal output level of a public address system totally inadequate for communicating to employees. In such an instance, it is desirable that the output volume level of the public address system be raised sufficiently to be audible above the increased noise level. Likewise, in private homes, passing airplanes and street noises may occasionally render the ordinarily satisfactory volume level of a television receiver partially or even totally insufficient. Under such a condition the viewer must either suffer through the disturbance or leave his viewing position and turn up the volume. If he elects to do the latter, he will likely find that after the noise has subsided, the volume level is unpleasantly high and that another adjustment is necessary.

The present invention is directed to an audio control system which responds to the relative difference in levels between a desired program signal and the noise level within a given listening area to vary the gain of the reproduced program signal so as to maintain a substantially constant signal-to-noise ratio in that area. Some prior-art control systems have relied on the use of multiple band-pass filters to differentiate between the desired program signal and the noise in the listening area. Such systems have all had the drawback of degrading the frequency response of the reproduced program and thus have been impractical for use in high-fidelity reproducing instruments. Furthermore, by their nature such systems cannot respond to noise in the frequency range of the signal, and so are inherently unable to protect the signal content adequately against noise in the most important frequency range.

A second approach utilized in prior-art control systems was to baffle the microphone to prevent it from responding to the reproduced program signal. The microphone was intended to pick up noise only from the listening area and the amplified output of the microphone was utilized to directly control the volume level of the reproduced program. Achieving the required sound isolation between the microphone and speakers in such systems required the use of elaborate baffling and wide separation. In many sound systems, including those of present day radio and television receivers, the necessary degree of isolation would be very difficult, if not impossible, to obtain.

A third approach utilized in prior-art systems is particularly applicable where the program signal occurs in short bursts separated by long pauses, as in airplane terminals where arriving and departing airplanes are announced. In such systems, the noise sound level is sampled at the loudspeaker immediately before the announcement is made, the level of the sound to be reproduced is adjusted in accordance with this sampling, and the message is reproduced at the adjusted level. It is readily apparent that should the noise level change during the program, these prior-art control systems will not make a corresponding change in the program signal. For this reason, such systems are suitable only for short messages, and not for long announcements or continuous programs such as lectures, music, drama, or the like. Such systems also require a knowledge of when the pauses in the signal will occur, and thus are most useful in conjunction with a program-originating source. In contrast, the present invention requires no such separate information about the organization of the signal, but operates entirely automatically.

It is a general object of this invention, therefore, to provide a new and improved audio gain control system for varying the level of a reproduced signal within a given listening area in response to changes in the ambient noise level within that area.

It is a more specific object of the invention to provide an audio gain control system for maintaining the program signal-to-noise ratio within a given listening area substantially constant.

It is a still more specific object of the invention to provide an improved audio gain control system which does not require that the form or content of the desired program be limited.

It is another object of the invention to provide an economical audio control system which does not require expensive and elaborate acoustic baffling.

Accordingly, the invention is directed to a control system for varying the level of a desired audible program signal within a given listening area directly with fluctuations in the ambient noise level within the area. The system comprises a source of desired audio signals having an output level dependent on an applied control effect, and a first audio channel having an input terminal coupled to the audio source and an output terminal, the channel serially comprising a loudspeaker for reproducing the audio signals as audible program signals within the listening area, and a microphone responsive to both the audible program signals and the ambient noise level. Means are included for establishing a first predetermined band-pass characteristic in this first audio channel. The system further includes a second audio channel having an input terminal coupled to the audio source and an output terminal, and means for establishing a second predetermined band-pass characteristic in this second audio channel substantially identical to the first predetermined characteristic. Detector means coupled to the first and second audio channel output terminals are included for generating a control effect representative of the relative difference in audio signal levels between the output terminals, as are means for applying a predetermined portion of the generated control effect to the audio source to increase the audible program level with increases in the ambient noise level within the listening area.

The features of the present invention which are believed to be novel are set forth with particularity in the appended claims. The organization and manner of operation, together with further objects and advantages thereof, may best be understood by reference to the following description taken in conjunction with the accompanying drawing, in which like reference numerals refer to like elements in the several figures, and in which:

Figures 1, 2:
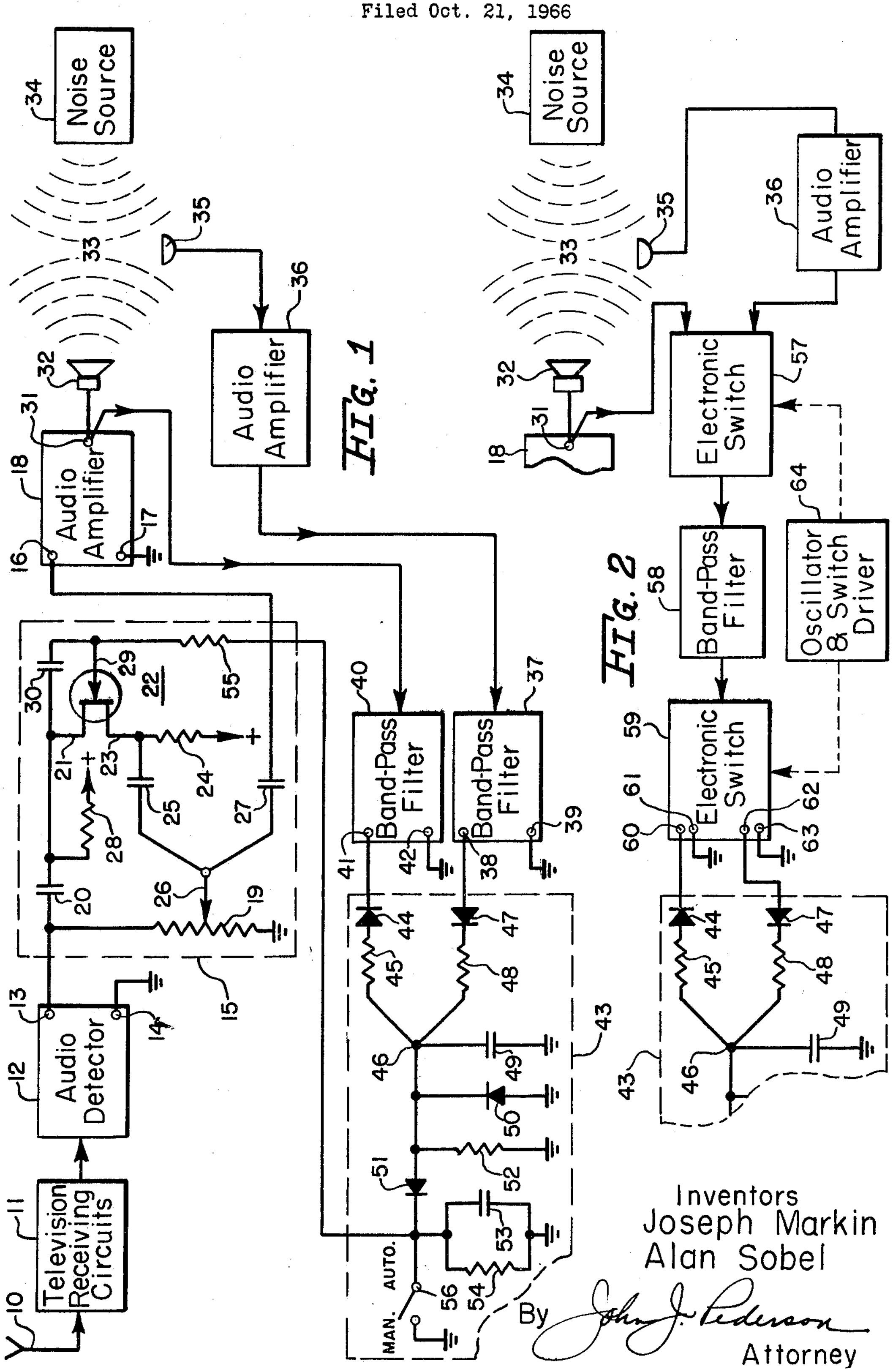
FIGURE 1 is a block diagram of a television receiver including an audio control system constructed in accordance with one embodiment of the invention.
FIGURE 2 is a block diagram of a portion of a television receiver showing another embodiment of the invention.

The television receiver shown in FIGURE 1 comprises an antenna 10 coupled to television receiving circuits 11, which include the usual translating, amplifying and detecting circuits for deriving a composite video-frequency signal from a received television transmission. The composite signal output of receiving circuits 11 is coupled to a conventional audio detector 12 wherein an audio signal is derived and appears between output terminals 13 and 14. This signal is coupled by a voltage-controlled attenuator stage 15 to the input terminals 16 and 17 of an audio amplifier 18.

Voltage-controlled attenuator 15 comprises a potentiometer 19 shunt connected across output terminals 13 and 14. Terminal 14 is grounded and terminal 13 is connected by a capacitor 20 to the input electrode 21 of an electron control device 22, which in this embodiment is a field effect transistor. The output electrode 23 of device 22 is connected by a resistor 24 to a source of positive unidirectional potential and by a capacitor 25 to the arm 26 of potentiometer 19. Arm 26 is further connected by a coupling capacitor 27 to input terminal 16 of audio amplifier 18; the remaining input terminal 17 is grounded. Input electrode 21 is connected to a source of positive unidirectional potential by a resistor 28 and to the control electrode 29 of device 22 by a by-pass capacitor 30. Audio amplifier 18 has an output terminal 31 which is connected to a sound reproducer 32, in this case a conventional loudspeaker. The output of reproducer 32 radiates into a general listening area indicated by broken line representation 33 in FIGURE 1.

Also radiating into listening area 33 is a noise source 34, and a microphone 35 is positioned to respond to sound developed in listening area 33. The output of microphone 35 is applied to an audio amplifier stage 36 which, in turn, is connected to a first band-pass filter 37 having output terminals 38 and 39. A second band-pass filter 40 having output terminals 41 and 42 is connected to output terminal 31 of audio amplifier 18. The outputs of filters 37 and 40 are coupled to a summing detector represented by dashed outline 43. Terminal 42 of filter 40 is grounded and terminal 41 is connected to the cathode electrode of a detector diode 44. The anode electrode of diode 44 is connected by a resistor 45 to a juncture 46. Output terminal 39 of filter 37 is grounded and terminal 38 is connected to the anode electrode of a detector diode 47. The cathode electrode of diode 47 is connected by a resistor 48 to juncture 46. A capacitor 49 is connected between juncture 46 and ground to serve as a common filter for the two detector diodes 44 and 47. Juncture 46 is further connected to the cathode electrode of a diode 50, to the anode electrode of a diode 51 and to one terminal of a resistor 52. The anode electrode of diode 50 and the remaining terminal of resistor 52 are grounded and the cathode electrode of diode 51 is shunted to ground by an RC timing network comprising the parallel combination of a capacitor 53 and a resistor 54. The cathode electrode of diode 51 is further connected to the control electrode 29 of device 22 by an isolation resistor 55 and to one contact of a single-pole single-throw mode selector switch 56. The remaining contact of switch 56 is grounded.

The receiver portion of the system is entirely conventional in design and need not be described in detail. A transmitted signal is intercepted by antenna 10 and amplified and translated to a composite television signal by television receiving circuits 11. The composite signal includes audio information which is derived by audio detector 12 and appears between detector output terminals 13 and 14. Potentiometer 19 operates as a voltage divider of the detected audio signal, and a portion of this signal dependent on the position of arm 26 is coupled by coupling capacitor 27 to input terminal 16 of audio amplifier 18. This signal, after amplification by audio amplifier 18, is utilized to drive speaker 32.

In accordance with the invention, means are incorporated for varying the volume of the reproduced program signal in accordance with variations in an applied control effect. It will be appreciated that volume of the reproduced program is dependent on the effective voltage division of potentiometer 19. In the embodiment of FIGURE 1, a field effect transistor 22 varies this voltage division by controllably shunting that portion of potentiometer 19 located between arm 26 and terminal 13. The shunt path serially includes capacitor 20, input electrode 21, device 22, output electrode 23 and capacitor 25. The amount of shunting varies with the conductivity of device 22 which is conveniently varied by a control effect or potential applied through isolation resistor 55. In practice the values of capacitors 20 and 25 are selected to limit the low-frequency response of the shunt path so that as the conductivity of device 22 increases, the relative low-frequency response of the reproduced program decreases. This is especially desirable in consumer radio and television receivers, where, for reasons of economy, it is often necessary that the ability of amplifier 18 and reproducer 32 to handle low-frequency audio signals be limited. By limiting the low-frequency response of the applied program signal, unnecessary distortion is avoided not only without materially compromising the intelligibility of reproduced speech, but with the effect of improving its intelligibility in the presence of noise. Resistors 24 and 28 are included to obtain operating bias for device 22 and capacitor 30 prevents the audio signal applied to input electrode 21 from being interpreted as a control effect by simultaneously applying an identical audio signal to control electrode 29.

The program output of speaker 32 and the noise from noise source 34 are disseminated to the listening area or sound field represented by the dashed outline 33 in FIGURE 1. Microphone 35 responds to the combined noise and program signal to generate an audio signal representative of the total sound level within the listening area. This signal is amplified by audio amplifier 36 and applied to band-pass filter 37, which allows only those signals falling within the band of approximately 200 to 3000 hertz to pass unattenuated. The signal path from terminal 31 to terminals 38 and 39 (including speaker 32, sound field 33, noise source 34 and microphone 35) may be thought of as a first audio channel responsive to the combined program and noise levels in sound field 33. The output of this first audio channel, appearing at terminals 38 and 39, is average detected by a first averaging detector comprising diode 47, resistor 48 and capacitor 49 to produce a positive potential at juncture 46 representative of the combined noise and program signal levels in listening area 33.

The system includes a second audio channel consisting of the audio path interconnecting terminal 31 and the output terminals of filter 40. This channel is responsive only to the level of the reproduced program signal and includes a band-pass filter 40 having band-pass characteristics substantially identical to its counterpart in the first audio channel. The output of filter 40, appearing at terminals 41 and 42, is average detected by a second averaging detector comprising diode 44, resistor 45 and capacitor 49. This detector produces a negative potential at juncture 46 dependent on the relative amplitude of the desired program signal.

Capacitor 49 serves as a common filter element for the two independent averaging detectors, and it follows that the net voltage or bias developed across this capacitor is dependent on the relative average difference in levels between the signals from the two audio channels. Averaging detectors, with time constants substantially longer than the period of the lowest-frequency signal passed by band-pass filters 37 and 40 are employed for this summing detector to avoid the deleterious effects of phase variations present with any instant-by-instant signal comparison. Because of the common filter capacitor, the time constants of the two detectors are easily matched at approximately 0.3 second.

Since summing detector 43 relies on a subtraction of the averaged second channel program signal from the averaged first channel program signal to determine the noise level in sound field 33, optimum performance is obtained only when the band-pass characteristics of the two channels are at least substantially matched. Any substantial mis-matching may result in the development of an erroneous output potential at juncture 46 with abrupt changes in the reproduced program. To facilitate matching the channels and to make the system most responsive to those noise components most disturbing to a listener, the two audio channels are limited to a bandwidth of approximately 200 to 3000 hertz. This band-pass is particularly advantageous because a listener is most sensitive to signals and noises in the 1000 to 3000 hertz range and the frequencies which contribute most to speech intelligibility lie in the range of 200 to 3000 hertz.

The potential developed at juncture 46 is applied through diode 51 to an RC timing circuit consisting of capacitor 53 and resistor 54. This network, in combination with resistors 52, 48, and 45, the equivalent series resistances of diode 47 and filter 37 and diode 44 and filter 40, the resistance of diode 50, and capacitor 49, serves a two-fold purpose. First, it determines the attack time of the system, that is, the amount of time the system requires to respond to a sudden increase in the ambient noise level. Secondly, it controls the release time, or the time required for the system to return to its nominal level after the noise disturbance has ceased. It is usually desirable to have the system respond more rapidly to increases than to decreases in the ambient noise level. For example, the sound from an airplane fluctuates as the plane passes and recedes into the distance, and if the system follows these fluctuations too closely, the resulting effect may be very annoying to a listener. By use of dual time constants the program signal is made to increase rapidly as the noise begins to be annoying and to decrease slowly as the interfering sound dies out. For most environments, it has been found that a desirable attack time constant is between 0.25 and 0.5 second, while a desirable release time constant is between 1.0 and 2.0 seconds.

Separate attack and release time constants are obtained through the action of hold-off diode 51. Upon occurrence of a sudden increase in noise level, a positive potential is developed at juncture 46 as capacitor 49 charges. When this potential exceeds the forward breakdown voltage of diode 51, capacitors 49 and 53 are effectively in parallel and the charging rate, or attack time, is determined primarily by the sum of their capacitances and the equivalent series resistance of resistor 48, diode 47, the output resistance of filter 37 and the equivalent series resistance of resistor 45, diode 44, and the output resistance of filter 40. Under conditions of diminishing noise, diode 51 becomes back-biased so that the discharge rate, or release time, of the summing detector is determined primarily by capacitor 53 and resistor 54. By proper choice of capacitor 53 and resistor 54 this time constant is made substantially longer than the attack time constant. Diode 51 serves the additional function of holding off the charging of capacitor 53, and hence the application of a control potential to voltage-controlled attenuator 15, until the potential at juncture 46 exceeds the forward breakdown voltage of the diode, thus preventing small changes in signal or program level from unnecessarily affecting the system.

The effect of the shunt-connected diode 50 is to improve system performance at large program signal levels. When the reproduced program is at a high level, there is a tendency for juncture 46 to be driven negative. Diode 50 maintains juncture 46 at ground potential or above, so that any increase in ambient noise can immediately drive capacitor 49 positive without having to override an existing and unnecessary negative charge. Diode 50 also acts as a variable resistance from juncture 46 to ground, the magnitude of which varies as a function of the potential appearing at juncture 46. For potentials near the breakdown potential of diode 50, the resistance of the diode is variable. Thus, when the potential at juncture 46 goes negative with respect to ground, the resistance presented by diode 50 gradually decreases, preventing the potential at juncture 46 from going much below ground potential. When the potential at juncture 46 goes positive with increasing noise, the resistance of diode 50 increases until it is high enough to be of no concern. In the transition region, the varying resistance of diode 50 tends to make the operation of the system stable, by affecting both the magnitude of the potential developed at juncture 46 and its rate of change. Diode 50 is preferentially a germanium diode, since its resistance change is more gradual than that of a silicon diode.

Single-pole single-throw mode switch 56 is included to allow the system to be disabled when desired. In the automatic position this switch is open and the potential developed across the time constant network of capacitor 53 and resistor 54 is applied through isolation resistor 55 to the control electrode of field effect transistor 22. In the closed position of switch 56, the control electrode of device 22 is grounded and summing detector 43 has no control over the volume level of the reproduced program.

As was earlier explained, voltage-controlled attenuator 15 functions to impress a portion of the detected audio signal from terminals 13 and 14 of audio detector 12 on the input terminals of audio amplifier 18. The portion so impressed is dependent on the potential developed at juncture 46 of summing detector 43, which, in turn, is dependent on the difference between the desired program signal and the noise level in the listening area.

By varying the gain of the first and second audio channels connected to microphone 35 and audio amplifier 18, respectively, a particular signal-to-noise ratio is established for which juncture 46 can be said to have a nominal potential, which in this embodiment is approximately zero volts. As the noise level increases, the signal in the first audio channel increases and develops a positive potential at juncture 46. This bias is applied through the time constant network to voltage-controlled attenuator 15 where it increases the conductivity of device 22 and increases the output of audio amplifier 18. As the volume level of the reproduced program increases, the increased signal in the second audio channel tends to drive juncture 46 negative. By virtue of the feedback loop established by the summing detector, the level of the reproduced signal continues to increase until it is again at a higher volume level than the ambient noise.

Although a single type of voltage-controlled attenuator utilizing a field effect transistor has been shown, it will be appreciated that any system able to control an audio signal in response to an applied control effect could be used. For instance, by use of a suitable DC amplifier and variable light source it would be possible to use a light-dependent resistor in place of device 22.

In FIGURE 2 is shown a circuit which obviates the need for separate band-pass filters. As mentioned earlier, it is essential for optimum results that the frequency response of the two channels be closely matched. This is so because the system determines the ambient noise level in the listening area by comparing or summing two separate program signals. Any substantial difference in frequency response between the two channels would result in the development of an erroneous potential at juncture 46 and cause the system to expand, or unnecessarily increase the level of, a desired program signal with changes in frequency. To avoid the difficulties associated with matching the two audio channels, a pair of electronic audio switches are utilized to alternately switch the outputs of amplifier 18 and microphone 35 through a common band-pass filter.

In FIGURE 2, output terminal 31 of audio amplifier 18 is coupled to one input of an electronic switch 57, and the output of audio amplifier 36 is coupled to the other input of electronic switch 57. Electronic switch 57 has a single output connected to a band-pass filter 58 which, in turn, is connected to the input of a second electronic switch 59. Electronic switch 59 has two pairs of output terminals, 60, 61 and 62, 63. Terminal 60 is connected to the cathode electrode of detector diode 44, and terminal 61 is grounded. Output terminal 62 is connected to the anode electrode of diode 47 and terminal 63 is grounded. An oscillator and switch driver stage 64 has first and second outputs connected to electronic switches 57 and 59. In all other respects, the embodiment of FIGURE 2 may be identical to that of FIGURE 1.

With the exception of the use of a single band-pass filter, the operation of the embodiment of FIGURE 2 is identical to that of FIGURE 1. Electronic switches 57 and 59 are driven by the oscillator and switch driver stage 64 to alternately couple the outputs of audio amplifiers 18 and 36 to the single band-pass filter 58. Likewise, electronic switch 59 is driven by stage 64 to alternately connect the output of band-pass filter 58 to the first and second averaging detectors of summing detector 43, so that the output of band-pass filter 58 is fed to terminals 60 and 61 when its input is fed from terminal 31, and its output is fed to terminals 62 and 63 when its input is fed from amplifier 36.

Band-pass filter 58 has substantially the same band-pass limiting effect as filters 37 and 40 of FIGURE 1 with the exception that it may accomplish additional filtering to remove any spurious signals generated by electronic switches 57 and 59. The filter circuitry is entirely conventional in design and for that reason need not be shown here.

Thus the invention provides an audio control system which has the distinct advantage over prior art systems of not requiring that the frequency response or character of the reproduced program be limited. Accordingly, the system is as well suited for high-fidelity and stereo instruments as it is for paging and public address applications.

The system does not rely on a limitation in frequency response for sensing the presence of noise within a desired listening area, but rather on a comparison or summing technique developed around a pair of averaging detector circuits to sense noise by cancellation of the average program signal. Because of its relative simplicity, the advantages of the invention may be achieved in commercial television and radio products at modest cost.

While particular embodiments of the invention have been shown and described, it will be obvious to those skilled in the art that changes and modifications may be made without departing from the invention in its broader aspects, and, therefore, the aim of the appended claims is to cover all such changes and modifications as fall within the true spirit and scope of the invention.

We claim:

1. In a control system for varying the level of a desired audible program signal within a given listening area directly with fluctuations in the ambient noise level within said area:

a source of desired audio signals having an output level dependent on an applied control signal;

a first audio channel having an input terminal coupled to said audio source and an output terminal, said channel serially comprising a loudspeaker for reproducing said audio signals as audible program signals within said listening area, and a microphone coupled to said loudspeaker through the ambient atmosphere in said listening area and responsive to both said audible program signals and said ambient noise level;

a second audio channel having an input terminal coupled to said audio source and an output terminal;

a single band-pass filter, having a predetermined frequency response, switchable into either of said first or second audio channels;

detector means coupled to said first and second audio channel output terminals for generating a control signal representative of the relative difference in audio signal levels between said output terminals;

and means for applying a predetermined portion of said generated control signal to said audio source to increase said audible program signal with increases in said ambient noise level within said listening area.

2. A control system as described in claim 1 wherein switching means are included for alternately switching said single filter into said first and second audio channels.

References Cited

UNITED STATES PATENTS

| | | | |
|---|---|---|---|
| 3,057,960 | 10/1962 | Kaiser. | |
| 3,109,066 | 10/1963 | David. | |
| 2,338,551 | 1/1944 | Stanko. | |
| 2,616,971 | 11/1952 | Kannenberg. | |
| 2,991,358 | 7/1961 | Wilcox ---------- | 325—475 X |
| 3,290,442 | 12/1966 | Suganuma. | |
| 3,296,373 | 1/1967 | Suganuma. | |

KATHLEEN H. CLAFFY, Primary Examiner

CHARLES JIRAUCH, Assistant Examiner